(12) United States Patent
Miyata et al.

(10) Patent No.: US 7,623,488 B2
(45) Date of Patent: Nov. 24, 2009

(54) RADIO BASE STATION AND PROGRAM FOR RADIO BASE STATION

(75) Inventors: Takeo Miyata, Gifu (JP); Tadayoshi Itou, Kaizu-gun (JP)

(73) Assignee: Kyocera Corporation, Kyoto (JP)

( * ) Notice: Subject to any disclaimer, the term of this patent is extended or adjusted under 35 U.S.C. 154(b) by 764 days.

(21) Appl. No.: 10/362,648

(22) PCT Filed: Aug. 27, 2001

(86) PCT No.: PCT/JP01/07298

§ 371 (c)(1),
(2), (4) Date: Aug. 4, 2003

(87) PCT Pub. No.: WO02/17666

PCT Pub. Date: Feb. 28, 2002

(65) Prior Publication Data

US 2004/0022205 A1 Feb. 5, 2004

(30) Foreign Application Priority Data

Aug. 25, 2000 (JP) ............................. 2000-256525

(51) Int. Cl.
*H04Q 7/00* (2006.01)
(52) U.S. Cl. .................. 370/329; 370/380; 370/442; 455/63.1; 455/450
(58) Field of Classification Search .............. 370/230, 370/277, 280, 318, 319, 328, 329, 335, 342, 370/347, 336, 370, 427, 294, 337, 348, 380, 370/442, 445, 447–448, 340, 341, 369; 375/130, 375/141, 260, 267, 343, 346, 347; 455/101, 455/3.01, 434, 450, 452.1, 452.2, 525, 562.1, 455/67.11

See application file for complete search history.

(56) References Cited

U.S. PATENT DOCUMENTS

| | | | | |
|---|---|---|---|---|
| 4,262,356 A | * | 4/1981 | Lautier et al. ............... | 370/323 |
| 5,508,707 A | * | 4/1996 | LeBlanc et al. ............. | 342/457 |
| 5,515,378 A | | 5/1996 | Roy, III et al. | |

(Continued)

FOREIGN PATENT DOCUMENTS

JP      10-285104 A     10/1998

(Continued)

OTHER PUBLICATIONS

Tanaka, Daisuke et al., "Blocking Rate Performance of SDMA with a 3-element Adaptive Array", The Institute of Electronics Information and Communication Engineers, Feb. 1998, pp. 95-100.

(Continued)

*Primary Examiner*—Ricky Ngo
*Assistant Examiner*—Pao Sinkantarakorn

(57) ABSTRACT

A wireless base station comprises a response vector calculation unit (561), an RSSI measuring unit (562), an MSE calculation unit (563), an FD calculation unit (564) and the like, and those units obtain an index showing communication quality of at least one of two mobile stations that are intended to be space-division multiplexed. According to the index, a control unit (80) judges the suitability of the two mobile stations for space-division multiplexing and performs space-division multiple access communication when judging suitable. The effect achieved with this construction is that the wireless base station maintains quality of communication between the wireless base station and mobile stations at a certain satisfactory level when performing space-division multiple access communication.

10 Claims, 7 Drawing Sheets

U.S. PATENT DOCUMENTS

| | | | |
|---|---|---|---|
| 5,634,199 A | 5/1997 | Gerlach et al. | |
| 5,802,046 A * | 9/1998 | Scott | 370/329 |
| 5,886,988 A * | 3/1999 | Yun et al. | 370/329 |
| 5,909,649 A * | 6/1999 | Saunders | 455/450 |
| 5,966,670 A * | 10/1999 | Keskitalo et al. | 455/562.1 |
| 6,041,237 A * | 3/2000 | Farsakh | 455/450 |
| 6,147,645 A | 11/2000 | Yukitomo et al. | |
| 6,240,098 B1 * | 5/2001 | Thibault et al. | 370/329 |
| 6,650,630 B1 * | 11/2003 | Haartsen | 370/345 |
| 7,130,635 B2 * | 10/2006 | Cerwall et al. | 455/452.2 |
| 2004/0095907 A1 * | 5/2004 | Agee et al. | 370/334 |
| 2007/0042786 A1 * | 2/2007 | Chillariga et al. | 455/450 |

FOREIGN PATENT DOCUMENTS

| | | |
|---|---|---|
| JP | 11-313364 | 11/1999 |
| JP | 2001-106696 | 4/2000 |
| JP | 2000-224097 | 8/2000 |
| JP | 2002-505048 | 2/2002 |
| JP | 2002-530026 | 9/2002 |
| JP | 2002-530998 | 9/2002 |
| WO | WO 93/12590 | 6/1993 |
| WO | WO 98/30047 | 7/1998 |
| WO | WO 99/40648 | 8/1999 |
| WO | WO 00/28757 | 5/2000 |
| WO | WO 00/31892 | 6/2000 |

OTHER PUBLICATIONS

Kohno, R. "Software Antenna and its Communication Theory for Mobile Radio Communication", Personal Wireless Communication 1997 IEEE International Conference on Mumbai, India, Dec. 17-19, 1997, New York, NY, USA, pp. 227-233.

* cited by examiner

FIG. 2

Threshold Table 200

| 201 | 202 | 203 | 204 | 205 | 206 |
|---|---|---|---|---|---|
| Correlation Threshold Jt | Electric Field Strength Ratio Threshold Kt | Transmission Timing Difference Threshold Lt | MSE Threshold Et | Fading Speed Threshold St | Electric Field Strength Threshold It |

FIG. 3

Quality Index Value Table 300

| Time Slot No. | Channel No. | Response Vector | Electric Field Strength | Transmission Timing | Mean Square Error (MSE) | Fading Speed (FD) |
|---|---|---|---|---|---|---|
| | 301 | 302 | 303 | 304 | 305 | 306 | 307 |
| 2 | 1 | R1 | I1 | P1 | E1 | S1 |
| | 2 | R2 | I2 | P2 | E2 | S2 |
| | 3 | (null) | (null) | (null) | (null) | (null) |
| | 4 | (null) | (null) | (null) | (null) | (null) |
| 3 | 5 | R5 | I5 | P5 | E5 | S5 |
| | 6 | (null) | (null) | (null) | (null) | (null) |
| | 7 | (null) | (null) | (null) | (null) | (null) |
| | 8 | (null) | (null) | (null) | (null) | (null) |
| 4 | 9 | R9 | I9 | P9 | E9 | S9 |
| | 10 | R10 | I10 | P10 | E10 | S10 |
| | 11 | R11 | I11 | P11 | E11 | S11 |
| | 12 | R12 | I12 | P12 | E12 | S12 |

FIG. 4

New PS Information Table 400

| Response Vector $R_{NEW}$ | Electric Field Strength $I_{NEW}$ | Transmission Timing $P_{NEW}$ | Mean Square Error $E_{NEW}$ | Fading Speed $S_{NEW}$ |
|---|---|---|---|---|
| 401 | 402 | 403 | 404 | 405 |

RADIO BASE STATION AND PROGRAM FOR RADIO BASE STATION

TECHNICAL FIELD

The present invention relates to a wireless base station for performing space-division multiplex communication with a plurality of mobile stations.

BACKGROUND ART

In recent years, an increase in the number of subscribers to mobile communication services has created a need to expand capacity of a radio zone that each wireless base station covers. One of multiple access techniques responding to this need is Space-division Multiple Access (SDMA).

SDMA is a technique for a wireless base station to communicate with a plurality of mobile stations at the same time at the same frequency by dividing a space. The division of space is achieved by the wireless base station by generating the most suitable directivity pattern to each mobile station. The directivity pattern represents the direction and the strength of radio waves to be radiated or received.

The wireless base station comprises, as a mechanism for forming directivity patterns, a plurality of antennas and a Digital Signal Processor (DSP). When transmitting or receiving signals, the wireless base station forms directivity patterns as desired by weighting the amplitude and phase of each signal radiated or received via each antenna. Here, each value used for weighting is referred to as a weighting factor, and a group of weighting factors used for forming one directivity pattern is referred to as a weight vector.

The wireless base station, using an adaptive array method, follows a mobile station that issues a signal of which incoming direction is unknown so as to form the most suitable directivity pattern thereof. One of the principles achieving this operation is Minimum Mean Square Error (MMSE). The MMSE technique requires a reference signal. The reference signal is a signal serving as a target for a signal obtained by weighting each reception signal to be as close as possible. The wireless base station employing the MMSE technique determines a weight vector in a manner to minimize the difference between the reference signal and the signal obtained by weighting. Using the weight vector determined in this way, the directivity pattern will be of the most suitable one for receiving a signal transmitted from the intended mobile station.

On the other hand, in the case of another multiple access technique of Time-division Multiple Access/Time-division Duplex (TDMA/TDD), each slot includes a bit pattern, such as a preamble and a unique word, which are known to a receiving end, preceding a signal indicative of actual information.

Thus, when communicating using a combination of MMSE-based SDMA and TDMA/TDD, the wireless base station may use a preamble, a unique word, or the like as a reference signal.

To be more specific, the wireless base station 1) sets an intended weight vector as an initial value, 2) compares a reference signal such as a preamble, unique word, or the like with the actual signal obtained by weighting using the weight vector so as to obtain an error therebetween, and 3) adjusts the weight vector value in a manner to minimize the error. Repeating this operation for each symbol of the bit pattern, the weight vector value converges to one value with the passage of time, so that the signal indicative of the actual information is extracted by weighting using the weight vector converged. After receiving the known bit pattern such as the preamble or the unique word, the wireless base station identifies a symbol represented by the extracted signal and uses the signal corresponding to the symbol as the reference signal, assuming that the identified symbol is correct. When transmitting, the wireless base station transmits a signal using the weight vector calculated at the time of reception that has taken place immediately before.

In order to prevent interference possibly caused by SDMA and to maintain adequate communication quality during communication, the wireless base station judges whether each slot is in a suitable condition for space-division multiplexing, and prohibits space-division multiplexing in a time slot judged not suitable while permitting space-division multiplexing in a time slot judged suitable. There are two ways to make the suitability judgment.

One way is to make the judgment based on a correlation value between reception-response vectors of two mobile stations that are intended to be space-division multiplexed. The wireless base station calculates reception-response vectors of each of the two mobile stations and then a correlation value between the two reception-response vectors. Here, the response vector is information about the incoming direction of a signal from a mobile station, and the correlation value serves as an index showing how close the incoming directions of signals from two mobile stations are. In other words, a relatively large correlation value indicates that the two mobile stations are located in approximately the same direction, so that it is considered impossible to separate the signals using different directivity patterns. Thus, the wireless base station judges that space-division multiplexing is not suitable when the correlation value exceeds a predetermined threshold value.

The other the way is to make the judgment based on an electric field strength ratio between signals from two mobile stations that are intended to be space-division multiplexed. The wireless base station obtains electric field strengths of the signals from the two mobile stations using the reception-response vectors and calculates the electric field strength ratio between them.

A relatively large electric field strength ratio indicates that the electric field strength ratio exceeds the antenna gain ratio however suitable the directivity patterns may be formed, so that it is impossible to properly separate the two signals. Thus, the wireless base station judges that space-division multiplexing is not suitable when the electric field strength ratio exceeds a predetermined threshold value.

Yet, there may be a case where the wireless base station fails to calculate weight vectors of two mobile stations and to form appropriate directivity patterns although it has been judged in the conventional technique mentioned above that space-division multiplexing is suitable.

When the directivity patterns are not appropriately formed, there may be a case where a mobile station that newly requests allocation of communication channel can not start communication or where a mobile station already in communication is disconnected. This leads to the above-mentioned problem that quality of communication with each mobile station is not always ensured.

DISCLOSURE OF INVENTION

To address the above problems, the object of the present invention is to provide a wireless base station and a program for the wireless base station that improve accuracy in the suitability judgment for space-division multiple access communication so as to ensure communication between the wireless base station and a mobile station with a certain satisfactory level of quality.

To achieve the above object, a wireless base station of the present invention with a space-division multiple access communication mechanism comprises judging means and communication means. The judging means judges whether to perform space-division multiple access communication with a first mobile station and a second mobile station according to an index showing communication quality of at least one of the two mobile stations. The communication means performs space-division multiple access communication with the first mobile station and the second mobile station when the judging means judges to perform space-division multiple access communication.

Here, the index is a transmission timing difference between a transmission timing of a signal from the wireless base station to the first mobile station and a transmission timing of a signal from the wireless base station to the second mobile station, and the judging means judges to perform space-division multiple access communication when the transmission timing difference is not smaller than a predetermined timing difference.

With this construction, the following effect is achieved. In the case where the transmission timing difference between the two mobile stations is close to zero, that is, where the wireless base station transmits a signal to the first mobile station and a signal to the second mobile station approximately at the same time, the two signals will have the same unique word. Therefore, the first mobile station may not be able to separate the signal transmitted to the first mobile station itself and the signal transmitted to the second mobile station, and errorlessly extract the signal transmitted to the second mobile station in mistake for the signal to the first mobile station itself. The same may occur to the second mobile station. Therefore, according to the present invention, it is judged to perform space-division multiple access communication when the transmission timing difference is not smaller than the predetermined transmission timing difference, and not to perform space-division multiple access communication when the transmission timing difference is smaller. This achieves the effect to keep a mobile station from errorlessly extracting a signal transmitted to another mobile station.

Alternatively, the index may be an error between a value of a signal received from the first mobile station and a value of a reference signal for the first mobile station, and the judging means judges to perform space-division multiple access communication when the error is not larger than a predetermined value.

With this construction, the error is equivalently the difference between an ideal directivity pattern and an actual directivity pattern and shows the accuracy in directivity pattern formation most precisely. In the case where a mobile station with low accuracy is space-division multiplexed with another mobile station, adverse effect is exerted on not only the mobile station with low accuracy but also the other mobile station. Therefore, according to the present invention, it is judged to perform space-division multiple access communication when the error is not larger than the predetermined value, and not to perform the space-division multiple access communication when the error is larger. This achieves the effect of ensuring accuracy in directivity pattern formation, thereby improving the communication quality.

Alternatively, the index may be a travel amount of the first mobile station per unit time, and the judging means judges to perform space-division multiple access communication when the travel amount is not larger than a predetermined travel amount.

In practice, a wireless base station is set with long intervals between each antenna for the sake of better diversity gain. When the intervals between the antennas are long, the directivity pattern formed thereby is inevitably weak at responding to positional change of a mobile station. It is especially difficult to follow a mobile station traveling at a high speed. Therefore, according to the present invention, it is judged to perform space-division multiple access communication when the travel amount is not larger than the predetermined travel amount, and not to perform space-division multiple access communication when the travel amount is larger. Similarly to the above, this achieves the effect of ensuring accuracy in directivity pattern formation, thereby improving the communication quality.

Further, the judging means may judge, according to the index, whether to space-division multiplex the first mobile station and the second mobile station that is already in communication upon receipt of a channel allocation request from the first mobile station.

With this construction, it is judged whether a mobile station that newly requests a channel allocation is possibly space-division multiplexed in the same time slot with a mobile station that is already in communication.

Alternatively, the index may be anyone of (1) transmission timing difference between a transmission timing of a signal from the wireless base station to the first mobile station and a transmission timing of a signal from the wireless base station to the second mobile station, (2) an error between a value of a signal transmitted from the first mobile station and a value of a reference signal for the first mobile station, (3) a travel amount of the first mobile station per unit time, (4) an electric field strength of a signal received from the first mobile station, (5) a correlation value between a response vector of the first mobile station and a response vector of the second mobile station, and (6) a ratio between the electric field of the signal received from the first mobile station and the electric field of a signal received from the second mobile station, and the judging means judges whether to space-division multiplex the two mobile stations through comparing at least three of the indices with their respective thresholds.

With this construction, whether space-division multiple access communication is possible is judged according to at least three of the plurality of indices. This achieves the effect of improving the accuracy in directivity pattern formation although probability of performing space-division multiplex access communication is decreased compared to conventional techniques. As a result, the communication quality is ensured.

Alternatively, a wireless base station with a space-division multiple access communication mechanism may comprise judging means and canceling means. Here, the judging means judges whether to maintain space-division multiple access communication between a first mobile station and a second mobile station that are already in communication by space-division multiple access according to indices showing communication quality of the first mobile station. The canceling means cancels space-division multiple access communication between the first mobile station and the second mobile station when the judging means judges not to maintain the space-division multiple access communication. The indices may be at least three of (1) a transmission timing difference between a transmission timing of a signal from the wireless base station to the first mobile station and a transmission timing of a signal from the wireless base station to the second mobile station, (2) an error between a value of a signal received from the first mobile station and a value of a reference signal for the first mobile station, (3) a travel amount of the first mobile station per unit time, (4) an electric field strength of a signal received from the first mobile station, (5) a correlation value between a response vector of the first mobile station and a response vector of the second mobile station, and (6) a ratio between the electric field strength of the signal received from the first mobile station and the electric strength of a signal received from the second mobile station.

With this construction, whether to maintain or cancel the space-division multiple access communication between mobile stations that are already in communication is judged according to at least three of the indices. This achieves the effect that the accuracy in directivity pattern formation is maintained, thereby ensuring the communication quality.

BRIEF DESCRIPTION OF DRAWINGS

FIG. 2 shows the construction of a threshold table 200;

FIG. 3 shows one example of a quality index value table 300;

FIG. 4 is shows the construction of a new PS information table 400;

BEST MODE FOR CARRYING OUT THE INVENTION

Hereinafter, description is given to a preferred embodiment of the present invention.

<Construction of Wireless Base Station 100>

Figure 1:
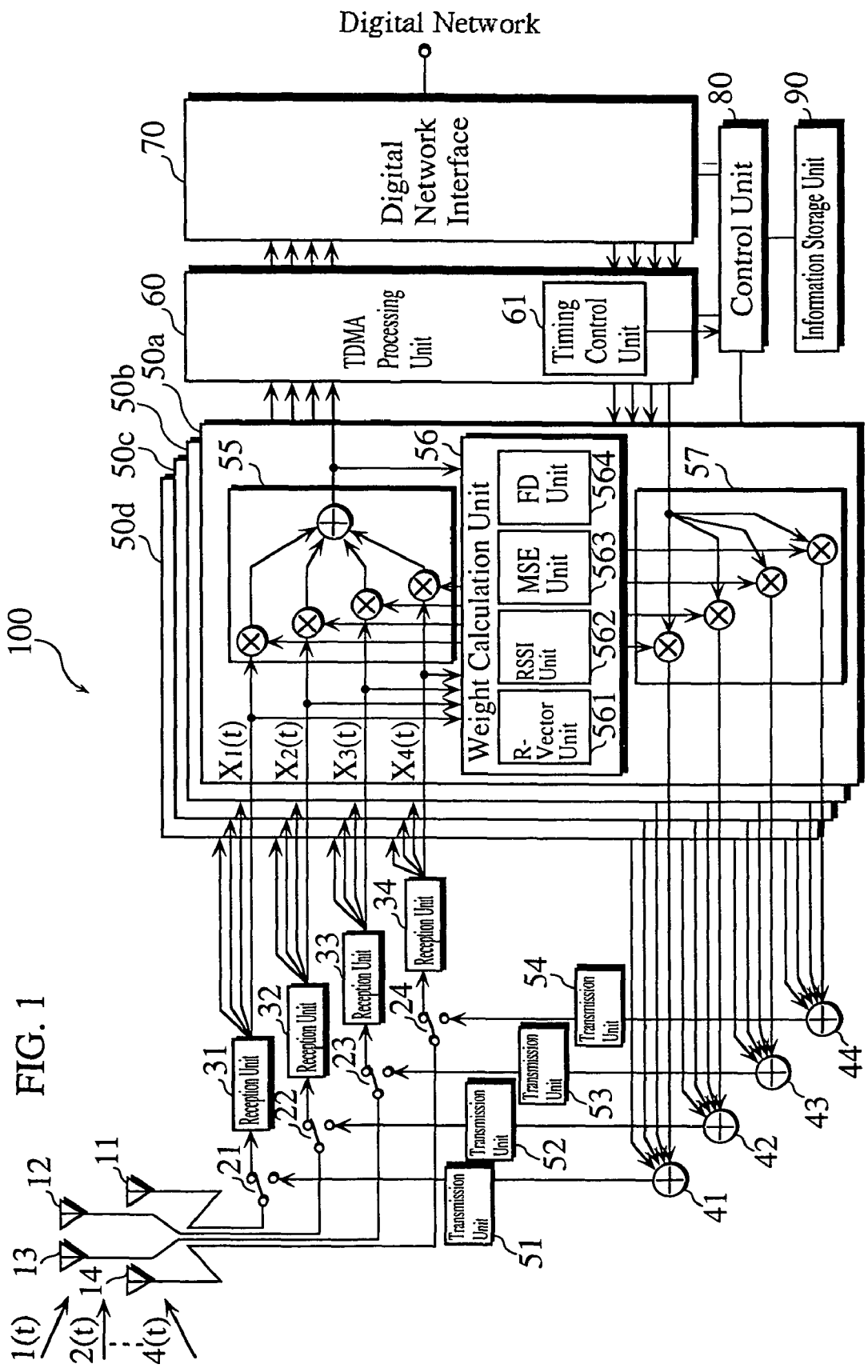
FIG. 1 is a block diagram showing the construction of a wireless base station 100 according to the embodiment of the present invention.

FIG. 1 is a block diagram showing the construction of a wireless base station 100.

In the figure, the wireless base station 100 comprises antennas 11-14, transmission/reception selecting switches 21-24, reception units 31-34, addition units 41-44, transmission units 51-54, signal processing units 50a-50d, a TDMA processing unit 60, a digital network interface unit 70, a control unit 80, and an information storage unit 90. The wireless base station 100 performs bidirectional time-division multiplex communication by a four-channel multi-carrier TDMA/TDD method, and, also performs space-division multiple access in each TDMA/TDD slot by an adaptive array method. Specifically, the wireless base station 100 judges, based on various kinds of information, whether it is suitable to space-division multiplex the two mobile station: one that newly requests communication channel allocation or that transmits a link channel establishment request (hereinafter referred to as a new mobile station), and the other one that has been allocated a communication channel already (hereinafter referred to as a mid-communication mobile station). Determination as to which communication channel to be allocated to the new mobile station is made in accordance with the judgment.

The transmission/reception selecting switches 21-24 are used for switching between transmission and reception in accordance with transmission or reception of a TDMA/TDD frame.

The reception unit 31 converts a high frequency signal received via the antenna 11 and the transmission/reception selecting switch 21 at the time of TDMA/TDD frame reception to a low frequency signal. The reception unit 31 then outputs the A/D converted signal to the signal processing units 50a-50d. The same description applies to the other reception units 32-34.

The addition unit 41 adds the signals outputted from the signal processing units 50a-50d and outputs the resulting signals to the transmission unit 51. In other words, the addition unit 41 performs multiplexing of the signals, which have been weighted to be transmitted to each mobile station via the antenna 11, and successively outputs the resulting signal to the transmission unit 51.

The same description applies to the other addition units 42-44.

The transmission unit 51 performs D/A conversion of a low frequency signal sent from the addition unit 41 to a high frequency signal, then amplifies and outputs the resulting signal to the antenna 11 via the transmission/reception selecting switch 21. The same description applies to the other transmission units 52-54.

The signal processing unit 50a is implemented by a DSP and conducts, under control exerted by the control unit 80, signal processing required for adaptive array control in correspondence with each mobile station that is time-division multiplexed in TDMA/TDD frames. The signal processing unit 50a in the figure shows the functional construction of signal processing and comprises an array reception unit 55, a weight calculation unit 56, and an array transmission unit 57. In each reception time slot, the array reception unit 55 weights and synthesizes signals from the reception units 31-34 using a weight vector calculated by the weight calculation unit 56 so that only reception signals corresponding to one mobile station are extracted. The array reception unit 55 then outputs the resulting signals to the TDMA processing unit 60. The array transmission unit 57, in each transmission time slot, weights transmission signals corresponding to the one mobile station from the TDMA processing unit 60 using the weight vector calculated by the weight calculation unit 56 and outputs the resulting signals to the addition units 41-44. The weight calculation unit 56 calculates the weight vector to extract reception signals that correspond to the one mobile station using signals sent from the reception units 31-34, and provides the resulting weight vector to the array reception unit 55 in the reception time slot. In each transmission time slot, on the other hand, the weight calculation unit 56 provides the array transmission unit 57 with the same weight vector as the one given to the array reception unit 55.

In addition, the weight calculation unit 56 calculates or detects, using the reception signals received from the mobile station, various parameters to judge the suitability for space-division multiplexing per time slot. Description of the weight calculation unit 56 is given later in detail.

The signal processing units 50b-50d each have the same construction as the signal processing unit 50a and perform, for one mobile station in each time slot, signal processing required for adaptive array control, detection of various parameters to judge the suitability for space-division multiplexing and the like.

That is to say, the signal processing units 50a-50d allocates one pair of transmission and reception time slots to a control channel and the remaining three pairs to communication channels, so that maximum of three mobile stations can be time-division multiplexed. Further, the maximum of four mobile stations may be space-division multiplexed if each time slot is controlled by adaptive array, resulting that the maximum of 12 mobile stations may be multiplexed to communicate with the wireless base station 100.

The TDMA processing unit 60 is positioned between the signal processing units 50a-50d and the digital network interface 70 to assemble/disassemble TDMA/TDD frames for each call.

The TDMA processing unit 60 further comprises a timing control unit 61. The timing control unit 61 generates reference timing for TDMA/TDD frames and also controls reception timing and transmission timing for each call. The transmission timing controlled hereby is also used to judge the suitability for space-division multiplexing just as each parameter calculated or detected by the weight calculation unit 56.

The digital network interface 70 is connected to an exchanger (not illustrated) via an ISDN and carries out functions, such as conversion of signals between the TDMA processing unit 60 and the exchanger in compliance with each transmission system.

The information storage unit 90 stores a threshold value table 200, a quality index value table 300 and a new PS information table 400, which are read and written by the control unit 80. Each data structure is described later in detail with reference to FIGS. 2-4.

Specifically speaking, the control unit 80 comprises a microprocessor, ROM (Read Only Memory), RAM (Random Access Memory), etc, and completes its function by the microprocessor performing a program stored in the ROM.

<Detailed Description of Weight Calculation Unit 56>

Hereinafter, description is given to calculation of weight vectors performed by the weight calculation unit 56.

$$y_1(t) = w_1^*(t)x_1(t) + w_2^*(t)x_2(t) + w_3^*(t)x_3(t) + w_4^*(t)x_4(t) \quad \text{(Expression 1)}$$

As shown in Expression 1, the array reception unit 55 calculates a temporary reception signal $y_1(t)$, which is the total sum of the products obtained by respectively multiplying the vectors $x_1(t)$, $x_2(t)$, $x_3(t)$ and $x_4(t)$ of the reception signals given from the reception units 31-34 by complex weight vectors $w_1^*(t)$, $w_2^*(t)$, $w_3^*(t)$ and $w_4^*(t)$, each of which is a complex conjugate of respective weight vector $w_1(t)$, $w_2(t)$, $w_3(t)$ or $w_4(t)$. Then, a judging unit (not illustrated) converts the temporary reception signal $y_1(t)$ into an extracted signal $S_1(t)$ by correcting the phase.

In the expression, "t" represents the time at which a signal arrives and takes on a value representing the lapse of time in each slot that is expressed in unit time taken for receiving one PHS-standard-defined symbol.

Accordingly, the reception signals $x_1(t)$, $x_2(t)$, $x_3(t)$ and $x_4(t)$, the complex weight vectors $w_1^*(t)$, $w_2^*(t)$, $w_3^*(t)$ and $w_4^*(t)$, and the like are series of signals where "t" is 1, 2 .... Here, the weight calculation unit 56 calculates the weight vector using an MMSE (Minimum Mean Square Error) technique in the flowing manner.

The weight vector is given an arbitrary initial value and the value of weight vector $w(t)$ is adjusted within a predetermined range in a manner to minimize the error between the reference signal $d(t)$ and the extracted signal $S_1(t)$. In this way, the weight vector $w(t)$ is renewed to $w(t+1)$ every unit time.

When the error between the reference signal $d(t)$ and the extracted signal $S_1(t)$ is expressed as $e(t)$, the following expression is given.

$$e(t) = d(t) - y_1(t) = \quad \text{(Expression 2)}$$
$$d(t) - (w_1^*(t)x_1(t) + w_2^*(t)x_2(t) + w_3^*(t)x_3(t) + w_4^*(t)x_4(t))$$

Thus, the mean square error of the error $e(t)$ is expressed as follows.

$$E[|e(t)|^2] = E[|d(t) - y_1(t)|^2] = \quad \text{(Expression 3)}$$
$$E[|d(t) - (w_1^*(t)x_1(t) + w_2^*(t)x_2(t) + w_3^*(t)x_3(t) + w_4^*(t)x_4(t))|^2]$$

Here, $E[\ ]$ expresses an ensemble mean.

Note that $w1(t+1)$ and $w2(t+1)$ respectively take on values obtained by correcting $w_1(t)$ and $w_2(t)$ in a manner to minimize the mean square error. With the passage of time, the weight vector converges to one value. By the time of receiving the actual data or the communication content that is successively transmitted after the preamble, the unique word or identifier and the like, the extracted signal $S_1(t)$ becomes an accurate one. After communication has started, the value that the weight vector finally takes on in the previous time slot may be used as an initial value for the weight vector in the next time slot.

Next, description is given to detection and calculation that the weight calculation unit 56 performs to obtain various parameters to judge the suitability for space-division multiplexing.

The weight calculation unit 56 comprises a response vector calculation unit 561, a Receive Signal Strength Indication (RSSI) measuring unit 562, a Mean Square Error (MSE) calculation unit 563, and an FD calculation unit 564. (In FIG. 3, however, these units 561-534 are referred to as the R-vector unit 561, the RSSI unit 562, the MSE unit 563 and the FD unit 564 respectively merely for the simplicity sake).

The response vector 561 calculates the response vector of a mobile station using each signal inputted from the reception units 31-34 to the signal processing unit 50a and the signal that has been weighted and synthesized by the array reception unit 55. The response vector represents the propagation path from the mobile station to the wireless base station 100, that is, the incoming direction and the like of the signals from the mobile station to the wireless base station 100.

Hereinafter, description is given to calculation that the response vector calculation unit 561 performs.

Each signal sent from mobile stations 1-4 are expressed as $S_1'(t-\tau_1)$, $S_2'(t-\tau_2)$, $S_3'(t-\tau_3)$ and $S_4'(t-\tau_4)$ respectively, and each signal inputted to the signal processing unit 50a via the antennas 11-14 (each also referred to as the first-forth antenna) and the reception unit 31-34 are expressed as $x_1(t)$, $x_2(t)$, $x_3(t)$ and $x_4(t)$ respectively. Expressed as $h_{ij}$ is the complex number representing the propagation path from the mobile station j to the antenna i. Here, $\tau_1$, $\tau_2$, $\tau_3$ and $\tau_4$ are the reception timing of the incoming signals at the wireless base station 100 with reference to t, and indicate the difference in incoming time of each incoming signal, which is derived from the difference in distance between each mobile station and the wireless base station 100.

Here, there is the relation between $S_1'(t-\tau_1)$–$S_4'(t-\tau_4)$ and $x_1(t)$–$x_4(t)$ given in the following expression.

$$x_1(t) = h_{11}S_1'(t-\tau_1) + h_{12}S_2'(t-\tau_2) +$$
$$h_{13}S_3'(t-\tau_3) + h_{14}S_4'(t-\tau_4) + n_1(t)$$

$$x_2(t) = h_{21}S_1'(t-\tau_1) + h_{22}S_2'(t-\tau_2) +$$
$$h_{23}S_3'(t-\tau_3) + h_{24}S_4'(t-\tau_4) + n_2(t)$$

$$x_2(t) = h_{31}S_1'(t-\tau_1) + h_{32}S_2'(t-\tau_2) +$$
$$h_{33}S_3'(t-\tau_3) + h_{34}S_4'(t-\tau_4) + n_3(t)$$

$$x_2(t) = h_{41}S_1'(t-\tau_1) + h_{42}S_2'(t-\tau_2) +$$
$$h_{43}S_3'(t-\tau_3) + h_{44}S_4'(t-\tau_4) + n_4(t)$$

(Expression 4)

Here, $n_1(t)$, $n_2(t)$, $n_3(t)$ and $n_4(t)$ represent noise components. The extracted signal $S_1(t)$ extracted by the wireless base station 100 and the signal $S_1'(t-\tau)$ actually sent from a user A is equal provided that the transmitted signal is received normally and separation and extraction are performed properly.

The response vector calculation unit 561 in the signal transmission unit 50a calculates the vector components $h_{11}$, $h_{21}$, $h_{31}$ and $h_{41}$ using $S_1^*(t)$, which is the complex conjugate of the extracted signal $S_1(t)$, and the signals $x_1(t)$, $x_2(t)$, $x_3(t)$ and $x_4(t)$ as given in the following expressions.

$$h_{11} = E[x_1(t)S_1^*(t-\tau_1)]$$
$$h_{21} = E[x_2(t)S_1^*(t-\tau_1)]$$
$$h_{31} = E[x_3(t)S_1^*(t-\tau_1)]$$
$$h_{41} = E[x_4(t)S_1^*(t-\tau_1)]$$

(Expression 5)

Here, E[ ] expresses an ensemble mean and being the mean value in a certain period of time of t=1, 2, . . . , and n. For example, let n be 100 so as to calculate the mean value in the period of 100 symbols.

Provided that the extraction signals $S_1(t)$, $S_2(t)$, $S_3(t)$ and $S_4(t)$ are properly extracted so that they are regarded as the equivalents of the transmitted signals $S_1'(t-\tau_1)$, $S_2'(t-\tau_2)$, $S_3'(t-\tau_3)$ and $S_4'(t-\tau_4)$ respectively, the following expression 6 is obtained from the expression 4 in the following manner: first $S_1'(t-\tau_1)$, $S_2'(t-\tau_2)$, $S_3'(t-\tau_3)$ and $S_4'(t\tau_4)$ in the expression 4 are replaced with $S_1(t)$, $S_2(t)$, $S_3(t)$ and $S_4(t)$ respectively; then, both sides of the expression 4 are multiplied by $S1^*(t)$; and finally, the ensemble means are calculated.

$$E[x_1(t)S_1^*(t-\tau_1)] = E[h_{11}S_1(t-\tau_1)S_1^*(t-\tau_1)] +$$
$$E[h_{12}S_2(t-\tau_2)S_1^*(t-\tau_1)] + E[h_{13}S_3(t-\tau_3)S_1^*(t-\tau_1)] +$$
$$E[h_{14}S_4(t-\tau_4)S_1^*(t-\tau_1)] + E[n_1(t)S_1^*(t-\tau_1)]$$

$$E[x_2(t)S_1^*(t-\tau_1)] = E[h_{21}S_1(t-\tau_1)S_1^*(t-\tau_1)] +$$
$$E[h_{22}S_2(t-\tau_2)S_1^*(t-\tau_1)] + E[h_{23}S_3(t-\tau_3)S_1^*(t-\tau_1)] +$$
$$E[h_{24}S_4(t-\tau_4)S_1^*(t-\tau_1)] + E[n_2(t)S_1^*(t-\tau_1)]$$

$$E[x_3(t)S_1^*(t-\tau_1)] = E[h_{31}S_1(t-\tau_1)S_1^*(t-\tau_1)] +$$
$$E[h_{32}S_2(t-\tau_2)S_1^*(t-\tau_1)] + E[h_{33}S_3(t-\tau_3)S_1^*(t-\tau_1)] +$$
$$E[h_{34}S_4(t-\tau_4)S_1^*(t-\tau_1)] + E[n_3(t)S_1^*(t-\tau_1)]$$

$$E[x_4(t)S_1^*(t-\tau_1)] = E[h_{41}S_1(t-\tau_1)S_1^*(t-\tau_1)] +$$

(Expression 6)

-continued
$$E[h_{42}S_2(t-\tau_2)S_1^*(t-\tau_1)] + E[h_{43}S_3(t-\tau_3)S_1^*(t-\tau_1)] +$$
$$E[h_{44}S_4(t-\tau_4)S_1^*(t-\tau_1)] + E[n_4(t)S_1^*(t-\tau_1)]$$

Here, $E[S_1(t)S_1^*(t)]=1$ and also $E[S_2(t)S_1^*(t)]=0$, $E[S_3(t)S_1^*(t)]=0$, $E[S_4(t)S_1^*(t)]=0$, $E[n_1(t)S_1^*(t)]=0$, $E[n_2(t)S_1^*(t)]=0$, $E[n_3(t)S_1^*(t)]=0$, and $E[_4(t)S_1^*(t)]=0$. This is because there is basically no correlation neither among the signals $S_1'(t-\tau_1)$, $S_2'(t-\tau_2)$, $S_3'(t-\tau_3)$ and $S_4'(t-\tau_4)$ transmitted from each mobile station, nor between the signal $S_1'(t-\tau)$ and the noise components.

Accordingly, the expression 5 is derived from the expression 6. In so doing, influence of noise components is eliminated from the expressions.

The response vector calculation unit 561 included in the signal processing unit 50a performs the calculation of the expression 5 to obtain the response vector $H_j=(h_{1j}, h_{2j}, h_{3j}, h_{4j})$ corresponding to the mobile station j. Also, each response vector calculation unit 561 included in the signal processing unit 50b-50d calculates the response vector in the similar manner.

In addition to the response vector of the mid-communication mobile station, the response vector calculation unit 561 also calculates a response vector of a new mobile station in the control channel upon receiving a communication channel allocation request from the new mobile station.

The RSSI measuring unit 562 in each time slot detects the electric field strength using the reception signal from the mobile station.

The RSSI measuring unit 562 also detects the electric field strength of a new mobile station in the control channel upon receiving a communication channel allocation request from the new mobile station.

The MSE calculation unit 563 in each time slot calculates the mean square error of the mobile station shown in the expression 3.

The MSE calculation unit 563 also calculates the MSE of a new mobile station in the control channel upon receiving a communication channel allocation request from a new mobile station.

The FD calculation unit 564 in each time slot calculates the fading speed of the mobile station. The fading speed is expressed in correlation between the previous response vector and the current response vector of the same mobile station. The previous response vector and the current response vector used herein are obtained by the response vector calculation unit 561 and stored in internal memory or the like. The previous response vector is, for example, the response vector of one frame before the current frame. When the fading speed is higher, it is indicated that the angle formed between the two incoming directions of signals from the same mobile station in the past and present is large. On the contrary, the lower fading speed indicates the angle is smaller. Thus, the fading speed serves as an index of the travel speed at which the mobile station travels from the previous location to the current location. When the travel speed is too high, it is difficult to form a directivity pattern that follows the movement of mobile station. In addition, it is likely to cause interference with signals of other mobile stations. For theses reasons, the mobile station in such condition is not suitable for space-division multiplexing with another mobile station at a time.

The FD calculation unit 564 also calculates the fading speed of a new mobile station in the control channel upon receiving a communication channel allocation request from a new mobile station.

As described above, each component of the weight calculation unit 56 in each of the signal processing units 50a~50d calculates or detects the parameter of a new mobile station. Each component of the weight calculation unit 56 outputs the thus obtained parameter to the control unit 80 and the control unit 80 stores those parameters in the information storage unit 90.

<Details of Information Storage Unit 90>

Hereinafter, description is given to the constructions of the threshold table 200, the quality index value table 300 and of the new PS information table 400, all of which are stored in the information storage unit 90.

FIG. 2 shows the construction of the threshold table 200.

As shown in the figure, the threshold table 200 comprises a correlation threshold $J_t$ (column 201), an electric field strength ratio threshold $K_t$ (column 202), a transmission timing difference threshold $L_t$ (column 203), a mean square error threshold $E_t$ (column 204), a fading speed threshold $S_t$ (column 205), and an electric field strength threshold $I_t$ (column 206).

The correlation threshold $J_t$ is the threshold of the correlation value between response vectors for a mid-communication mobile station and for a new mobile station.

The electric field strength ratio threshold $K_t$ is the threshold of the ratio between the electric field strengths of signals received from the mid-communication mobile station and from the new mobile station.

The transmission timing difference threshold $L_t$ is the threshold of the difference in the transmission timing between the mid-communication mobile station and the new mobile station.

The mean square error threshold $E_t$ is the threshold of MSE of the mid-communication mobile station and a new communication station.

The fading speed threshold $S_t$ is the threshold of the fading speed of the mid-communication mobile station and the new mobile station.

The electric field strength threshold $I_t$ is the threshold of the electric field strength of the mid-communication mobile station and the new mobile station.

These thresholds are preliminarily stored in the threshold table 200. The threshold table 200 may be so constituted that the thresholds are renewed, when appropriate, using the thresholds calculated by the control unit 80 or via a digital network.

FIG. 3 shows one example of the quality index value table 300.

As shown in the figure, the quality index value table 300 comprises columns of a time slot number 301, a channel number 302, a response vector 303, an electric field strength 304, a transmission timing 305, a mean square error 306, and a fading speed 307.

In the column of time slot number 301, the numerals 2, 3 and 4 show the numbers of the three time slots to which the communication channels are allocated.

In the column of channel number 302, each set of the channel numbers (1, 2, 3 and 4), (5, 6, 7 and 8), and of (9, 10, 11 and 12) is the numbers respectively corresponding to processing conducted by the signal processing units 50a, 50b, 50c and 50d in each of the time slots 2, 3 and 4.

Each line shows the time slot number, the channel number and the various parameters of that mid-communication mobile station that correspond to one mid communication mobile station. For example, in the line of the time slot number 2, the channel number 1, the parameters of the corresponding mid-communication mobile station is as follows: the response vector $R_1$, the electric field strength $I_1$, the transmission timing $P_1$, the mean square error $E_1$, and the fading speed $S_1$. A line filled with (null) indicates that there is no mobile station that is in communication using the channel corresponding to that channel number.

The table in the figure indicates that the wireless mobile station 100 communicates with two mobile stations in the time slot No. 2 using the channel Nos. 1 and 2 (the signal processing units 50a and 50b) by space-division multiplexing, one mobile station in the time slot number 3 using the channel number 5 (the signal processing unit 50a), and with four mobile stations in the time slot No. 4 using the channel Nos. 9, 10, 11 and 12 (the signal processing units 50a-50d) by space-division multiplexing.

Each parameter in the quality index value table 300 is the parameter outputted by each component of the weight vector calculation unit 56 and the timing control unit 61, and renewed by the control unit 80 slot by slot.

FIG. 4 shows the construction of the new PS information table 400.

As shown in the figure, the new PS information table 400 comprises various parameters of a new mobile station, namely a response vector $R_{NEW}$ (column 401), an electric field strength $I_{NEW}$ (column 402), transmission timing $P_{NEW}$ (column 403), a mean square error $E_{NEW}$ (column 404), and a fading speed $S_{NEW}$ (column 405) all of which are of the new mobile station.

The response vector $R_{NEW}$ is the response vector of the new mobile station and calculated from the signals on the control channel by the response vector calculation unit 561 when the wireless base station 100 receives a link channel establishment request from the new mobile station. The thus obtained response vector $R_{NEW}$ is stored in the new PS information table 400 by the control unit 80.

The electric field strength $I_{NEW}$ is the electric field strength of the new mobile station and is calculated from the signals on the control channel by the RSSI measuring unit 562 when the wireless base station 100 receives the link channel establishment request from the new mobile station. The thus obtained electric field strength $I_{NEW}$ is stored in the new PS information table 400 by the control unit 80.

The transmission timing $P_{NEW}$ is the transmission timing of the new mobile station and estimated from the reception timing at which the timing control unit 61 receives the link channel establishment request from the new mobile station. The thus obtained transmission timing $P_{NEW}$ is stored in the new PS information table 400 by the control unit 80. The timing control unit 61 described herein estimates the transmission timing of the new mobile station. Yet, the timing control unit 61 may be constituted to always determine a predetermined timing as the transmission timing of the new mobile station and to output to the control unit 80.

The mean square error $E_{NEW}$ is the mean square error of the new mobile station. The mean square error is calculated from the signals received on the control channel when the wireless base station 100 receives the link channel establishment request from the new mobile station, and then stored in the new PS information table 400 by the control unit 80.

The fading speed $S_{NEW}$ is the fading speed of the new mobile station and calculated from the signals received on the control channel when the wireless base station 100 receives the link channel establishment request from the new mobile station. In the case of the mid-communication mobile station, the fading speed is the correlation between the response vector of a previous frame and that of a current frame. In the case of a new mobile station, however, there is no response vector of a previous frame. Therefore, the fading speed $S_{NEW}$, for example, is the correlation between two response vectors of the current frame: one in the reception time slot in first part of the current frame and the other in the latter part.

<Operations for Link Channel Establishment>

Now, description is given to operations of the wireless base station with the control unit 80 being the focus.

Figure 5:
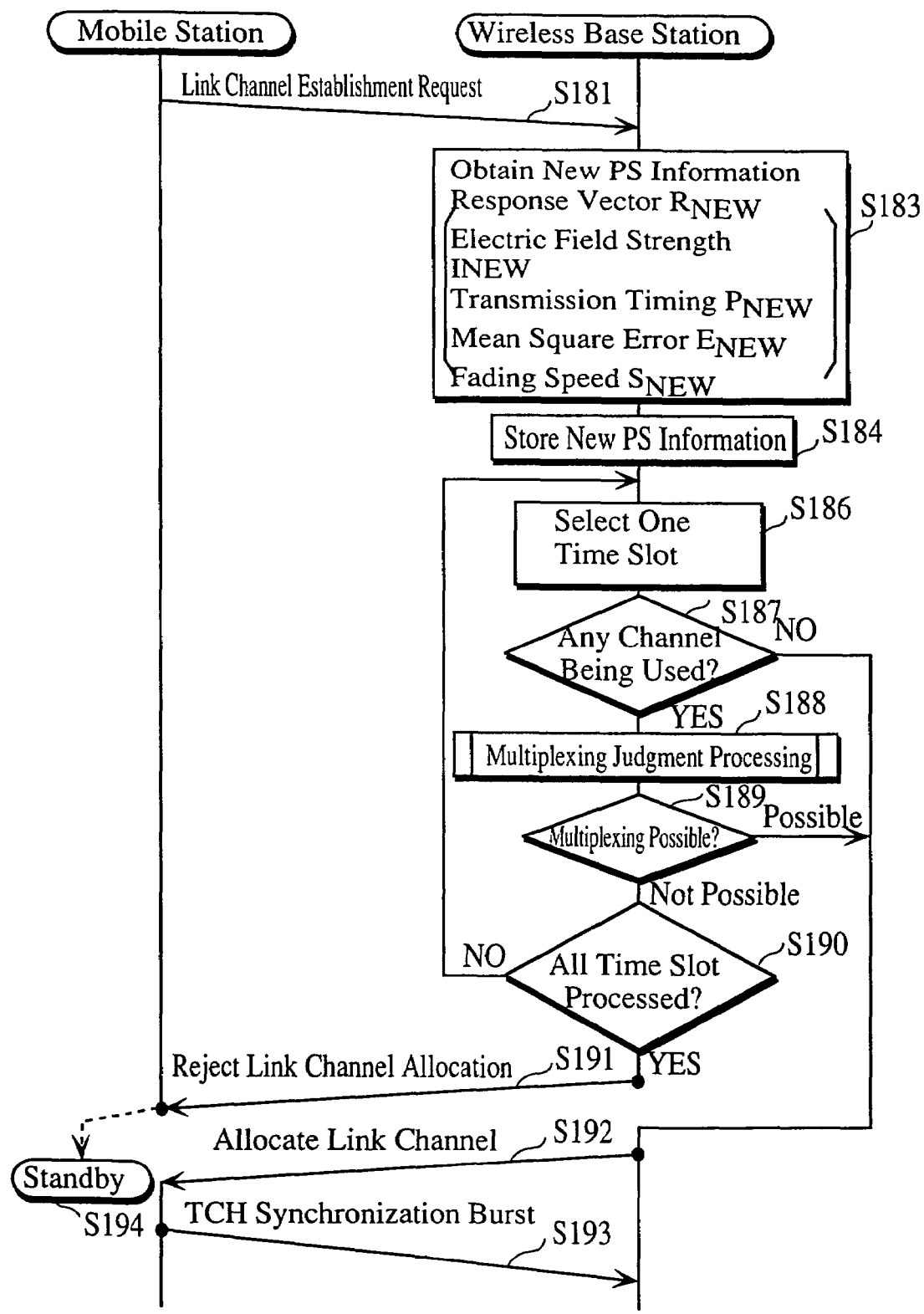
FIG. 5 is a sequence diagram mainly showing operations performed by a control unit 80 for link channel establishment.

FIG. 5 is a sequence diagram mainly showing operations conducted by the control unit 80 to establish a link channel.

Upon receiving a link channel establishment request from a new mobile station (step S181), the control unit 80 instructs the weight calculation unit 56 and the timing control unit 61 to obtain each parameter of the new mobile station, namely the response vector $R_{NEW}$, the electric field strength $I_{NEW}$, the transmission timing $P_{NEW}$, the mean square error $E_{NEW}$, and the fading speed $S_{NEW}$ (step S183), and then stores the thus obtained parameters in the new PS information table 400 in the information storage unit 90 (step S184).

Next, the control unit 80 judges the suitability of each time slot for space-division multiplexing to determine which channel should be allocated to the new mobile station.

To be more specific, the control unit 80 selects one time slot from the time slots No. 2, 3 and 4 (step S186) to judge whether there is a channel being used in the selected time slot, that is, whether there is any mobile station that is currently in communication using the time slot. The judgment is made with reference to the quality index value table 300 in respect to whether any line (channel) in the time slot is filled with parameters or all the lines (channels) in the time slot are null.

When it is judged that there is no channel using the selected time slot (step S187, NO), the control unit 80 carries out allocation of a link channel to the new mobile station (step S192) along with notification of vacant channels in the time slot. Then, the new mobile station and the wireless base station 100 exchanges TCH synchronous bursts to establish a link channel (step S193).

When it is judged in the step S187 that there is a channel using the selected time slot (step S187, YES), the control unit 80 performs the multiplexing judgment processing (step S188). When it is judged, as a result of the judgment processing, that multiplexing is possible (step S189, Possible), a link channel is allocated in the similar manner to the above link channel allocation so that a link channel is established (steps S192 and S193).

When it is judged, as a result of the multiplexing judgment processing in the step S188, that multiplexing is not possible (step S189, Not Possible), the control unit 80 repeats the same processing for the remaining time slots one by one (step S190).

When it is judged that multiplexing is not possible in all the time slots, the control unit 80 notifies the new mobile station that link channel allocation has been rejected (step S191). As a result, the new mobile station is put into a standby state (step S194).

Figure 6:
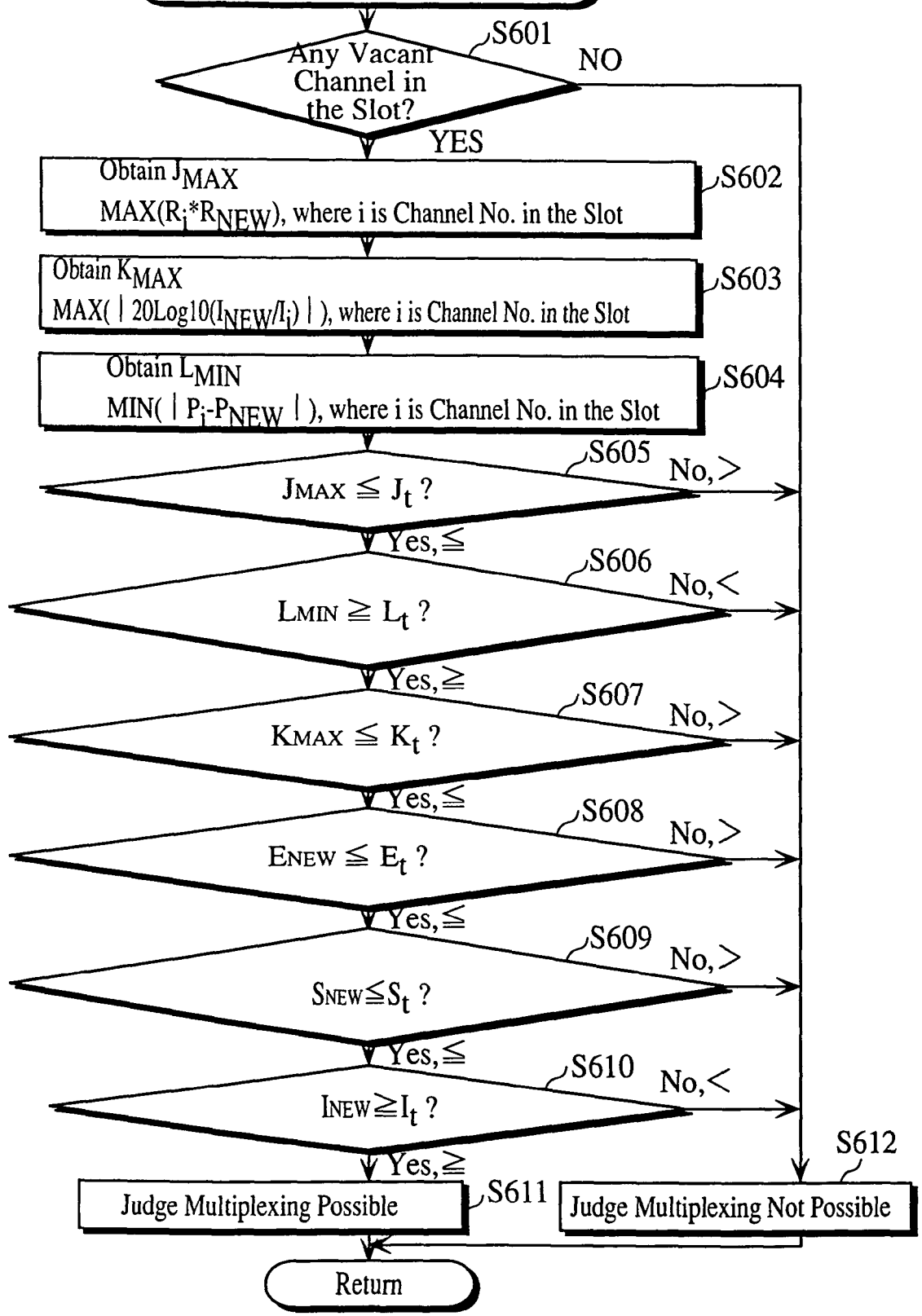
FIG. 6 is a flow chart showing details of the multiplexing judgment processing shown in FIG. 5.

FIG. 6 is a flow chart showing details of the multiplexing judgment processing shown in FIG. 5.

The control unit 80 judges whether there is a vacant channel in the selected time slot with reference to the quality index value table 300 (step S601).

As a result, when it is judged there is no vacant channel in the time slot, the control unit 80 judges that multiplexing is not possible and terminates the multiplexing judgment processing (step S612).

When there is a vacant channel, the control unit 80 performs calculation to obtain a maximum correlation value $J_{MAX}$, a maximum electric field strength ratio $K_{MAX}$, a minimum transmission timing difference $L_{MIN}$ from the parameters stored in the quality index value table 300 and data stored in the new PS information table 400 (steps S602, S603 and S604).

The maximum correlation value $J_{MAX}$ is the largest value of all the correlations between the response vector $R_{NEW}$ of the new mobile station and the response vector $R_i$ (where i denotes the channel number of each mid-communication mobile station) of each mid-communication mobile station in the time slot.

In the case of the quality index value table 300 shown in FIG. 3, for example, the response vectors of each mid-communication mobile station in the time slot No. 2 are $R_1$ and $R_2$. So, the control unit 80 calculates the correlation $J_1$ between $R_1$ and $R_{NEW}$ as well as the correlation $J_2$ between $R_2$ and $R_{NEW}$, and regard either $J_1$ or $J_2$, whichever is larger, as the maximum correlation value $J_{MAX}$.

When the correlation value between two mobile stations is large, they are located in approximately the same direction, so that it is considered impossible to separate signals of the two mobile stations using different directivity patterns. For this reason, the correlation between a new mobile station and a mid-communication mobile station is calculated and used as an index to judge the suitability for space-division multiplexing.

In the case of this example, the wireless base station 100 judges that the new mobile station and the mid-communication mobile station are not suitable for space-division multiplexing.

In addition, the wireless base station 100 measures the electric field strengths of signals from the two mobile stations and calculates the ratio between the two electric field strengths measured thereby.

To obtain the maximum electric field strength ratio $K_{MAX}$, the control unit 80 performs the expression 7 below to calculate the electric field strength ratio between the electric field strength $I_{NEW}$ of the new mobile station and the electric field strength $I_i$ of each mid-communication mobile station (where i denotes the channel number of each mid-communication mobile station). Then, the largest value of all the thus obtained electric field strength ratios is regarded as the maximum electric field strength ratio $K_{MAX}$.

$$K_i = |20 \log_{10}(I_{NEW}/I_i)| \quad \text{(Expression 7)}$$

In the case of the quality index value table 300 shown in FIG. 3, for example, the electric field strengths of each mid-communication mobile station in the time slot No. 2 are $I_1$ and $I_2$. So, the control unit 80 calculates the electric field strength ratio $K_1$ between $I_{NEW}$ and $I_1$ as well as the electric field strength ratio $K_2$ between $I_{NEW}$ and $I_2$, and regard either $K_1$ or $K_2$, whichever is larger, as the maximum electric field strength ratio $K_{MAX}$.

When the electric field ratio between two mobile stations is large, the strength ratio between them is expected to be larger than the gain ratio of the wireless base station 100. Thus, it is considered impossible to appropriately separate signals of the two mobile stations however suitable directivity patterns may be formed. For this reason, the electric field strength ratio between a new mobile station and a mid-communication mobile station is calculated and used as an index to judge the suitability for space-division multiplexing.

To obtain the minimum transmission timing difference $L_{MIN}$, the control unit 80 performs the expression 8 below to calculate the transmission timing difference between the transmission timing $P_{NEW}$ of the new mobile station and the transmission timing Pi of each mid-communication mobile station (where i denotes the channel number of each mid-communication mobile station). Then, the smallest difference of all the thus obtained transmission differences is regarded as the minimum transmission timing difference $L_{MIN}$.

$$L_i = |P_{NEW} - P_i| \qquad \text{(Expression 8)}$$

In the case of the quality index value table 300 shown in FIG. 3, for example, the transmission timings of each mid-communication mobile station in the time slot No. 2 are $P_1$ and $P_2$. So, the control unit 80 calculates the transmission timing difference $L_1$ between $P_{NEW}$ and $P_1$ as well as the transmission timing difference $L_2$ between $P_{NEW}$ and $P_2$ and regards either $L_1$ or $L_2$, whichever is smaller, as the minimum transmission timing difference $L_{MIN}$.

When the transmission timing difference between two mobile stations is small, the two mobile stations may not be able to separate signals from the wireless base station 100 properly and may errorlessly demodulate the signals transmitted to the other mobile station. For this reason, the transmission timing difference between a new mobile station and a mid-communication mobile station is calculated and used as an index to judge the suitability for space-division multiplexing.

Through the processing up to this point, the control unit 80 has calculated and obtained the indices to judge the suitability for space-division multiplexing, namely the maximum correlation value $J_{MAX}$, the maximum electric field strength ratio $K_{MAX}$, and the minimum transmission timing difference $L_{MIN}$. In addition, the control unit 80 obtains the mean square error $E_{NEW}$, the fading speed $S_{NEW}$ and the electric field strength $I_{NEW}$ from the new PS information table 400.

When the mean square error is large, it should be the case where the error used for array reception has not converged or remains at a considerable level. Thus, a directivity pattern can not be formed accurately for the mobile station with the large error. For this reason, the mean square error is used as an index to judge the suitability for space-division multiplexing.

Further, when the fading speed is high, that is, the travel amount in unit time is large, the mobile station travels a long distance during the time lug between the reception slot and the transmission slot. Therefore, even if the directivity pattern is formed with high accuracy at the time of reception and the same directivity pattern is formed at the time of transmission, it is inevitable that the resulting directivity pattern is largely deviated from the actual direction of the mobile station at the time of transmission. In case where a directivity pattern is formed improperly, an adverse effect is exerted on directivity pattern formation of other mobile stations. This is because it is difficult for the wireless base station 100 to direct a null point in the direction of the mobile station traveling at a high fading speed when forming directivity patterns of other mobile stations. For this reason the fading speed is used as an index to judge the suitability for space-division multiplexing.

In addition, when the electric field strength is too small, directivity patterns may not be formed with high accuracy. For this reason, the electric field strength is used as an index to judge the suitability for multiplexing.

Hereinafter, the control unit 80 performs the steps S605-S610 to compare the above indices with the thresholds stored in the threshold table 200.

The control unit 80 first compares the maximum correlation value $J_{MAX}$ with the correlation threshold $J_t$ (step S605). If the comparison shows that the maximum correlation value $J_{MAX}$ is not larger than the correlation threshold $J_t$, the control unit 80 goes on to the step S606. If not, the control unit 80 judges that multiplexing is not possible (step S612).

Next, the control unit 80 compares the minimum transmission timing difference $L_{MIN}$ with the transmission timing difference threshold $L_t$ (step S606). If the comparison shows that the minimum transmission timing difference $L_{MIN}$ is not smaller than the transmission timing difference threshold $L_t$, the control unit 80 goes on to the step S607. If not, the control unit 80 judges that multiplexing is not possible (step S612).

Next, the control unit 80 compares the maximum electric field strength ratio $K_{MAX}$ with the electric field strength ratio threshold $K_t$ (step S607). If the comparison shows that the maximum electric field strength ratio $K_{MAX}$ is not larger than the electric field strength ration threshold $K_t$, the control unit 80 goes on to the step S608. If not, the control unit 80 judges that multiplexing is not possible (step S612).

Next, the control unit 80 compares the mean square error $E_{NEW}$ with the mean square error threshold $E_t$ (step S608). If the comparison shows that the mean square error $E_{NEW}$ is not larger than the mean square error threshold Et, the control unit 80 goes on to the step S609. If not, the control unit 80 judges that multiplexing is not possible (step S612).

Next, the control unit 80 compares the fading speed $S_{NEW}$ with the fading speed threshold $S_t$ (step S609). If the comparison shows that the fading speed $S_{NEW}$ is not larger than the fading speed threshold St, the control unit 80 goes on to the step S610. If not, the control unit 80 judges that multiplexing is not possible (step S612).

Next, the control unit 80 compares the electric field strength $I_{NEW}$ with the electric field strength threshold $I_t$ (step S610). If the electric field strength $I_{NEW}$ is not smaller than the electric field strength threshold $I_t$, the control unit 80 goes on to the step S611. If not, the control unit 80 judges that multiplexing is not possible (step S612).

When all the judgments in the steps S605-610 result in "YES", the control unit 80 judges that it is possible to communicate with the new mobile station by multiplexing the new mobile station and the other mobile station(s) being in communication in that selected time slot (step S611).

In FIG. 6, the multiplexing judgment processing results in the judgment that multiplexing is possible only when all the six judgment conditions in the steps S605-610 are met. Yet, it is possible to judge that multiplexing is possible when one or some of the six conditions are met.

In the above processing, the control unit 80 judges the suitability of the new mobile station for space-division multiplexing. When the conditions are not met, the control unit 80 allocates no channel in that particular time slot to the new mobile station while allocating a channel in the time slot when the conditions are met or when no space-division multiplexing takes place in the time slot. That is to say, a new mobile station is allocated just a channel in a time slot where no space-division multiplexing takes place or, if space-division multiplexing is taking place, a time slot where communication quality is ensured, whereby communication stability is improved. As a result, communication property is improved, occurrences of interference are reduced, and poor quality of connection causing, for example, abnormal disconnection is avoided.

Further, in the present invention, the suitability for space-division multiplexing is judged based on not only the correlation value and electric field strength ratio (steps S605 and S607) but also four more judgment conditions (steps S606, S608, S609 and S610). Thus, although the probability that space-division multiplexing is judged suitable is decreased compared to conventional techniques, the accuracy of the suitability judgment for the space-division multiplexing is improved.

Up to this point, the description has been given to the preferred embodiment in which the suitability for space-division multiplexing is judged at the time of link channel establishment. In the description below, however, the control unit 80 also judges the suitability for space-division multiplexing even after link channel establishment. Here, the control unit 80 monitors a plurality of mobile stations that are already in communication by space-division multiplexing so as to judge the suitability for space-division multiplexing. When judging that space-division multiplexing is not suitable, the control unit 80 cancels the space-division multiplexing between the mobile stations concerned by way of channel switching, handover, or the like. Hereinafter, description is given to the monitoring processing.

<Monitoring Processing>

Figure 7:
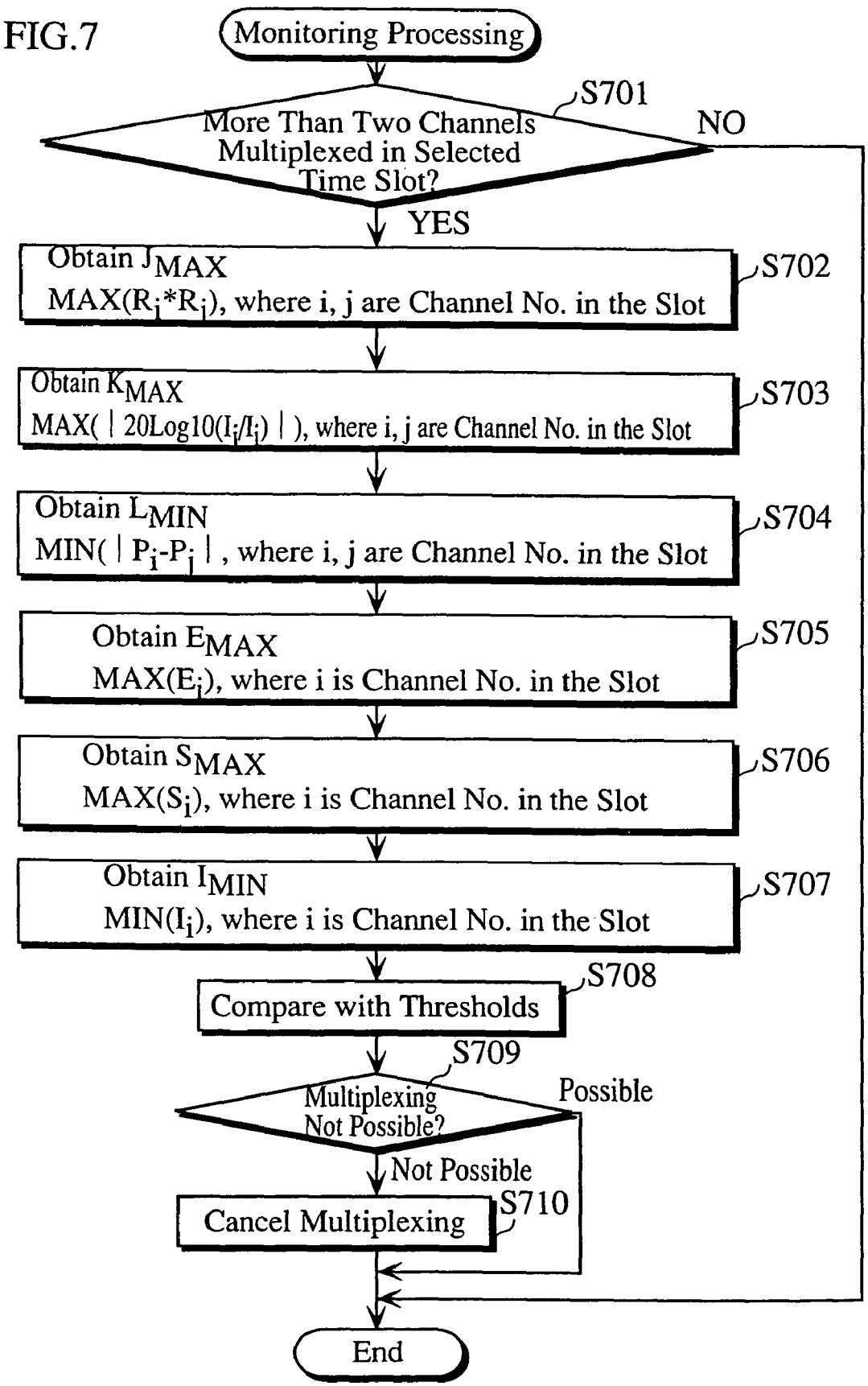
FIG. 7 is a flow chart showing monitoring processing performed by the control unit 80.

FIG. 7 is a flow chart showing the monitoring processing performed by the control unit 80.

The control unit 80 performs the monitoring processing shown in FIG. 7 slot by slot.

First, the control unit 80 judges whether space-division multiplex communication is performed in the currently selected time slot (step S701). The judgment is made with reference to how much and where data is stored in the quality index value table 300. Alternatively, the judgment is made with reference to whether at least two of the signal processing units 50*a*-50*d* are in operation.

When it is judged that no space-division multiplexing is performed, the control unit 80 terminates the monitoring processing.

When it is judged that space-division multiplexing is performed, the control unit 80 obtains a maximum correlation value $J_{MAX}$ (step S702). This maximum correlation value $J_{MAX}$ is obtained by the same calculation as that in the multiplexing judgment processing, yet it differs in that response vectors of two mid-communication mobile stations are used here. That is, to obtain the maximum correlation value $J_{MAX}$, first, a pair of mid-communication mobile stations i and j (where i and j each represent the channel number) is made with two of the mobile stations that are in communication in the time slot by space-division multiplexing, and the correlation value between them is calculated. This operation is repeated until there is no other possible pair left in the time slot and the largest value among the thus obtained correlation values is regarded as the maximum correlation value $J_{MAX}$.

Next, the control unit 80 obtains a maximum electric field strength ratio $K_{MAX}$ (step S703). To obtain this maximum electric field strength ratio $K_{MAX}$, a pair of mid-communication mobile stations i and j (where i and j each represent the channel number) is made with two of the mobile stations that are in communication in the time slot by space-division multiplexing, and the electric field strength ratio between them is calculated. This operation is repeated until there is no other possible pair left in the time slot and the largest value among the thus calculated electric field strength ratios is regarded as the maximum electric field strength ratio $K_{MAX}$.

Then, the control unit 80 obtains a minimum transmission timing difference $L_{MIN}$ (step S704). To obtain this minimum transmission timing difference $L_{MIN}$, a pair of mid-communication mobile stations i and j (where i and j each represent the channel number) is made with two of the mobile stations that are in communication in the time slot by space-division multiplexing, and the transmission timing difference between them is calculated. This operation is repeated until there is no other possible pair left in the time slot and the smallest value among the thus calculated transmission timing differences is regarded as the minimum transmission timing difference $L_{MIN}$.

Next, the control unit 80 obtains a maximum mean square error $E_{MAX}$ (step S705). This maximum mean square error $E_{MAX}$ is the largest value among all the mean square errors $E_i$ of the mobile stations that are in communication in the time slot by space-division multiplexing.

Next, the control unit 80 obtains a maximum fading speed $S_{MAX}$ (step S706). This maximum fading speed $S_{MAX}$ is the largest value among all the fading speeds $S_i$ of the mobile stations that are in communication in the time slot by space-division multiplexing.

Next, the control unit 80 obtains a minimum electric field strength $I_{MIN}$ (step S707). This minimum electric field strength $I_{MIN}$ is the smallest value of all the electric field strengths $I_i$ of the mobile stations that are in communication in the time slot by space-division multiplexing.

In the above-described manner, the control unit 80 obtains each index to judge the suitability for space-division multiplexing, and then performs the processing to compare those indices with the thresholds stored in the threshold table 200 (step S708). This threshold comparison processing is completed with the same steps as the steps S606-S612 in the flow chart shown in FIG. 6. The only differences are that the maximum mean square error $E_{MAX}$, the maximum fading speed $S_{MAX}$ and the minimum electric field strength $I_{MIN}$ are used in the steps S608-S610 replacing the means square error $E_{NEW}$, the fading speed $S_{NEW}$ and the electric field strength $I_{NEW}$ respectively.

As a result of the threshold comparison processing, when it is judged that multiplexing is not possible (step S709), the control unit 80 cancels the space-division multiplexing in that time slot (step S710). "To cancel the space-division multiplexing" used herein means to select at least one of the mobile stations that are in communication by space-division multiplexing, and to send a channel switching request or a handover request to that mobile station so that channel switching or handover is performed. There are several possible selections as to which mobile station should be subjected to cancellation of space-division multiplexing. One example is to select at least one of the mid-communication mobile stations i and the mid-communication mobile stations j from which the maximum correlation value $J_{MAX}$, the maximum electric field strength ratio $K_{MAX}$ or the minimum transmission timing difference $L_{MIN}$ are derived. Another example is to select at least one of the mobile stations i from which the maximum mean square error $E_{MAX}$, the maximum fading speed $S_{MAX}$, or the minimum electric field strength $I_{MIN}$ is derived.

Up to this point, the description has been given to the wireless base station 100 of the specific preferred embodiments consistent with the present invention. Yet, the present invention is not limited to the above embodiments and the following modifications are possible.

(1) In the above embodiment, the wireless base station 100 is constituted to judge, upon a channel allocation to a new mobile station, whether to space-division multiplex the new mobile station with a mobile station that is already in communication in the intended time slot. The "new mobile station" used herein referees to a mobile station that is moved from the radio zone of another wireless base station to the radio zone of the wireless base station 100, a mobile station that is turned on and then transmits a link channel establishment request in the radio zone of the wireless base station 100, or the like. Different from the above constitution, the wireless base station 100 may be constituted to judge the suitability for space-division multiplex communication before channel switching of a mid-communication mobile station from one time slot to another time slot of its own. At this time, the wireless base station 100 may judge whether to multiplex the mobile station that is indented to transfer with a mobile station, if any, that is already in communication in the intended time slot.

(2) The above preferred embodiment may be so modified that the wireless base station 100 uses parameters or the like that are obtained from a mid-communication mobile station instead of those obtained from a new mobile station when judging whether to perform space-division multiplex communication.

For example, when canceling space-division multiplex of one time slot according to the result of monitoring processing, the wireless base station 100 may store the number corresponding to that time slot and prohibits a new mobile station to be space-division multiplexed with a mobile station that is in communication in the time slot for a predetermined period of time.

Further, the wireless base station 100 may be constituted to detect, using the parameters of the mid-communication mobile station stored in the quality index value table 300, a time slot having unstable factors that might lower accuracy in directivity pattern formation so as to prohibit a new mobile station to be space-division multiplexed in that time slot.

To be more specific, the wireless base station 100 may be constituted to judge, with reference to the quality index value table 300, that a new mobile station may not be space-division multiplexed in the time slot where there is a mid-communication mobile station having the electric field strength higher than a predetermined threshold.

Further, the wireless base station 100 may be constituted to judge, with reference to the quality index value table 300, that a new mobile station can not be space-division multiplexed in the time slot where there is a mid-communication mobile station traveling at the fading speed higher than a predetermined threshold.

(3) Each operational procedure performed in the above preferred embodiment may be incorporated into a computer program that is executable by general-purpose computers or any other hardware equipment having a program execution mechanism to implement the operational procedures. Such a program may be recoded onto recording mediums and distributed or the program may be distributed via various communication paths. Examples of such recoding mediums include IC cards, optical disks, flexible disks, ROM, and the like.

(4) The operational procedures of the above program may be used as a method.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being included therein.

INDUSTRIAL APPLICABILITY

A wireless base station of the present invention is useful as a base station for a mobile communication system, which is required to increase the capacity for subscribes, such as wireless phones and mobile phones, as well as to improve the quality in communication.

The invention claimed is:

1. A wireless base station for communicating with a plurality of mobile stations by using a same unique word and a same time slot, comprising:
    identifying means for identifying transmission timing of signals transmitted with the same unique word, each transmitted to a different one of mobile stations within a time slot in a TDMA/TDD frame;
    judging means for judging whether a difference between transmission timing identified for a respective one of a first mobile station and a second mobile station that are assigned to a same time slot is greater than a predetermined timing difference threshold; and
    communication means for establishing communication with the first and second mobile stations within the same time slot using a space-division multiplexing, when the difference between transmission timing is judged to be greater than the timing difference threshold.

2. The wireless base station according to claim 1, further comprising:
    error calculating means for calculating an error between a reference signal and a signal received from the first mobile station; and
    error judging means for judging whether the error is smaller than an error threshold,
    wherein the communication means establishes communication with the first and second mobile stations within a same time slot using space-division multiplexing, when the error is judged to be smaller than the error threshold and the difference between transmission timing is judged to be greater than the timing difference threshold.

3. The wireless base station according to claim 1, further comprising:
    fading speed calculating means for calculating a fading speed of the first mobile station; and
    fading speed judging means for judging whether the fading speed is higher than a fading speed threshold,
    wherein the communication means establishes communication with the first and second mobile stations within a same time slot using space-division multiplexing, when the fading speed is judged to be lower than the fading speed threshold and the difference between transmission timing is judged to be greater than the timing difference threshold.

4. The wireless base station according to claim 1,
    wherein the judging means judges, upon receipt of a channel allocation request from the first mobile station, whether to communicate with the first mobile station by space-division multiplexing with the second mobile station that is already in communication.

5. The wireless base station according to claim 1, further comprising:
    threshold judging means for making at least one of:
    an error judgment by calculating an error between a reference signal and a signal received from the first mobile station to see whether the error is smaller than an error threshold;
    a fading speed judgment by calculating a fading speed of the first mobile station to determine whether the fading speed is lower than a fading speed threshold;
    an electric field strength judgment by measuring an electric field strength of the signal received from the first mobile station to determine whether the electric field strength is greater than an electric filed strength threshold;
    a correlation judgment by calculating a correlation value between a response vector of the first mobile station and a response vector of the second mobile station to determine whether the correlation value is smaller than a correlation threshold; and an electric field ratio judgment by calculating a ratio between the electric field strength of the signal received from the first mobile station and an electric field strength of a signal received from the second mobile station to determine whether the ratio is smaller than an electric field ratio threshold, wherein the communication means establishes communication with the first mobile and second mobile stations within a same time slot using space-division multiplexing, when all judgments made by the threshold judging means are affirmative and the difference between transmission timing is judged to be greater than the timing difference threshold.

6. The wireless base station according to claim 5, further comprising:

canceling means for constantly judging, while in communication with the first and second mobile stations using space-division multiplexing, whether to maintain the space-division multiplexing and for canceling the space-division multiplexing on judging in the negative, wherein the canceling means judges not to maintain the space-division multiplexing when any of the judgments made by the judging means and the threshold judging means are negative.

7. The wireless base station according to claim 1, further comprising:

selecting means for selecting a time slot in a TDMA/TDD frame; and judging means for judging whether there is a mobile station currently in communication using the time slot, wherein the judgment is made in reference to a quality value index.

8. The wireless base station according to claim 1, wherein the identifying means identifies transmission timing of signals transmitted to different mobile stations within a same time slot in a TDMA/TDD frame.

9. A communication method for use by a wireless base station that communicates with a plurality of mobile stations by using a same unique word and a same time slot, comprising:

an identifying step for identifying transmission timing of signals having the same unique word, each transmitted to a different one of mobile stations within a time slot in a TDMA/TDD frame;

a judging step for judging whether a difference between transmission timing identified for a respective one of a first mobile station and a second mobile station that are assigned to a same time slot is greater than a predetermined timing difference threshold; and a communication step for establishing communication with the first and second mobile stations within the same time slot using a space-division multiplexing, when the difference between transmission timing is judged to be greater than the timing difference threshold.

10. A computer-readable recording medium, stored with, embodied with, or encoded with computer executable instructions operable to cause predetermined communication control to be performed when said instructions are executed by a computer that is included in a wireless base station that communicates with a plurality of mobile stations by using a same unique word and a same time slot, the communication control including:

an identifying step for identifying transmission timing of signals having the same unique word each transmitted to a different one of mobile stations within a time slot in a TDMA/TDD frame;

a judging step for judging whether a difference between transmission timing identified for a respective one of a first mobile station and a second mobile station that are assigned to a same time slot is greater than a predetermined timing difference threshold; and a communication step for establishing communication with the first and second mobile stations within the same time slot using space-division multiplexing, when the difference between transmission timing is judged to be greater than the timing difference threshold.

* * * * *

UNITED STATES PATENT AND TRADEMARK OFFICE
CERTIFICATE OF CORRECTION

PATENT NO. : 7,623,488 B2  Page 1 of 1
APPLICATION NO. : 10/362648
DATED : November 24, 2009
INVENTOR(S) : Miyata et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1054 days.

Signed and Sealed this

Twenty-sixth Day of October, 2010

David J. Kappos
*Director of the United States Patent and Trademark Office*